Dec. 6, 1966    M. HUBER    3,290,024

MATERIAL EXCHANGE COLUMN

Filed March 10, 1965    2 Sheets-Sheet 1

Inventor:
Max Huber
BY Pennie, Edmonds,
Morton, Taylor and Adams
ATTORNEYS

Dec. 6, 1966    M. HUBER    3,290,024
MATERIAL EXCHANGE COLUMN
Filed March 10, 1965    2 Sheets-Sheet 2
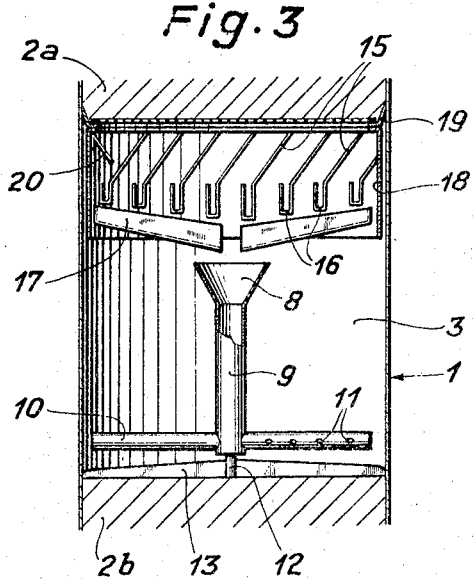
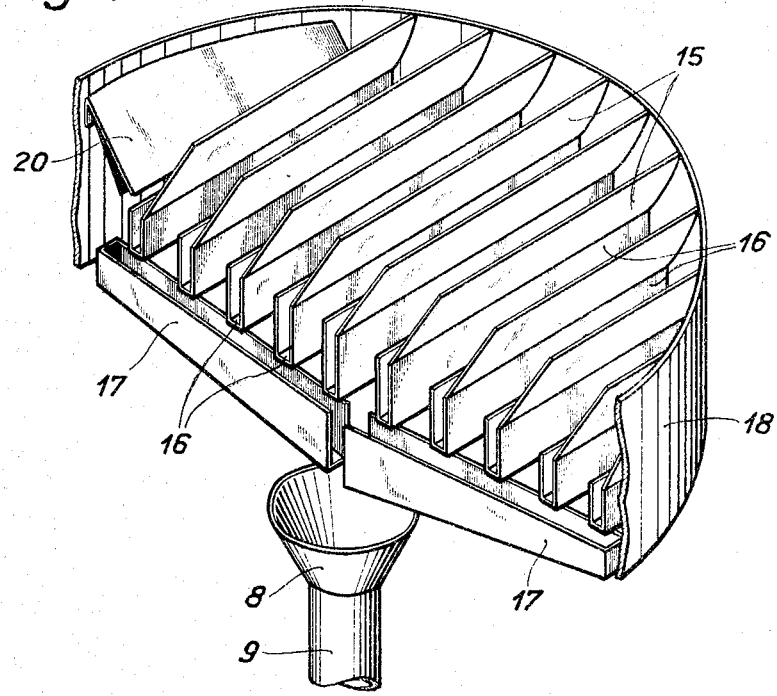
Inventor:
Max Huber
BY
Pennie Edmonds,
Morton, Taylor and Adams
ATTORNEYS United States Patent Office 3,290,024
Patented Dec. 6, 1966

3,290,024
MATERIAL EXCHANGE COLUMN
Max Huber, Winterthur, Switzerland, assignor to Sulzer Brothers Limited, Winterthur, Switzerland, a Swiss company
Filed Mar. 10, 1965, Ser. No. 438,681
Claims priority, application Switzerland, Mar. 19, 1964, 3,518/64
9 Claims. (Cl. 261—88)

The invention relates to a material exchange column in which a liquid and a gaseous medium flow countercurrent to each other, the column being subdivided into several material exchange sections which are separated vertically from one another by spaces in which collecting means are provided to collect the liquid from one material exchange section and convey the liquid to the material exchange section immediately below. More particularly, the invention relates to an improvement in liquid collecting means for such columns.

The usual columns of the kind in connection with which the invention can advantageously be used are the so-called "packed" columns in which statistical packings, such as Raschig rings, are provided in the material exchange sections, or in which the material exchange sections are provided with regular packings in layer form. However, the collecting means of the invention is also of use in columns of the kind wherein the various material exchange sections each take the form of a bunch of vertical parallel channels; both when the vertical channels are of large diameter in which case they are filled with statistical packings, and when the channels are of small diameter in which case the column is an embodiment of a so-called film column.

Material exchange columns of the kind described can be used, for instance, for distillation or rectification, or to extract or absorb one component from a gaseous mixture, by means of an external extracting or absorption liquid which is in material exchange with the gaseous mixture, or to separate isotope elements from a substance by means of a chemical exchange reaction, for instance, to separate deuterium from hydrogen. Exchange columns of this kind are also of use for separating molecules formed with different isotopes, for instance, for separating heavy water from light water, and for many other purposes.

It has previously been the practice to provide intermediate liquid collector and distributor means for the descending liquid at specific vertically spaced intervals in material exchange columns, the intermediate collectors and distributors collecting the liquid from the peripheral or edge zone of the column and returning it to the center of the column. However, liquid collector and distributor means of the kind described do not collect all of the descending liquid at one time, nor do they insure that all of the descending liquid streams will be mixed together or that the liquid that is collected will be evenly distributed over the material exchange section immediately below. The aim of the present invention is to devise collecting and distributing means for material exchange columns that will collect all the liquid descending from a material exchange section so that the various liquid streams are mixed and any differences in their concentrations will be evened out, the liquid then being distributed uniformly over the cross-section of the material exchange section immediately below. The result is an improved separation in the exchange process. It is a further and very important aim of the invention to devise collecting means that will occupy only a small proportion of the column cross-section and therefore produce only a very slight pressure drop in the rising gas flow, with the result that a further improvement in column efficiency and loading is obtained, particularly for vacuum operation at pressures below 100 mm. Hg.

To achieve these aims, the collecting means according to the invention are so devised that guide elements for the descending liquid streams are disposed in horizontally distributed relationship over the cross-section of the material exchange sections and are so inclined with respect to vertical as to cover in vertical projection the whole free column cross-section. The bottom edges of the guide elements are associated with collecting troughs which collect the liquid flowing down the guide elements and deliver the liquid thus collected preferably to the column center whence the liquid flows into a distributor means adapted to distribute the liquid uniformly over the cross-section of the material exchange section immediately below.

In an advantageous form of the invention, identical horizontally spaced guide elements are radially disposed like a vane ring around an inner tubular member disposed at the column center, and the collecting troughs associated with each guide element extend to such tubular member. The guide elements and the collecting troughs are connected at their ends remote from the column center to an outer tubular member which is secured to the inside of the column casing. In this embodiment, the extent of the total cross-section area of the column that is covered by the vertical projection of the inclined guide elements is reduced by the cross-section area of the inner tubular collecting member; however, the vertical projection of the inclined guide elements covers the entire "free" area of the column cross-section as this term is employed herein. The inclination of the guide elements at their inner edge can, if desired, be different from that at their outer edge. In another advantageous embodiment of the invention, the collecting means comprise at least one group of parallel, horizontally spaced guide elements disposed symmetrically with respect to a column diameter, and collecting troughs which are connected to the lower edges of the guide elements and which extend to at least one header trough adapted to convey the the collected liquid to the column center. The parallel guide elements are inclined as before and can take the form of plane or arcuate surfaces. The invention also covers collecting means wherein the angles of inclination of the parallel guide elements distributed over the column cross-section vary.

Other features of the improved liquid collecting means of the invention can be gathered from the embodiments thereof which are described hereinafter and which are shown in the accompanying drawings wherein:

FIG. 3 is a view in longitudinal section showing part of a material exchange column that is provided with another embodiment of collecting means according to the invention; and FIG. 4 is a fragmentary perspective view of the collecting means shown in FIG. 3.

Figure 1:
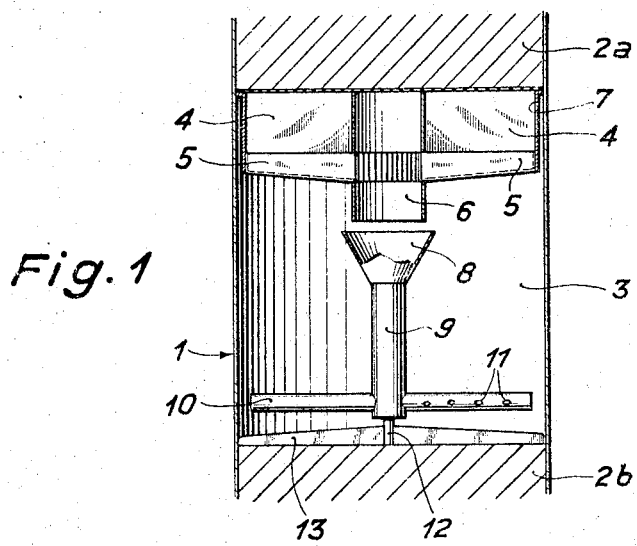
FIG. 1 is a view in longitudinal section showing part of a material exchange column that is provided with one embodiment of collecting means according to the invention.

FIG. 1 shows in longitudinal section a portion of a material exchange column 1 comprising upper and lower material exchange sections 2a and 2b each filled with conventional statistical packing elements, such as Raschig rings, or with regular packings in the form, for instance, of grooved slat-like elements. A space 3 separates the upper and lower sections 2a and 2b from one another.

Figure 2:
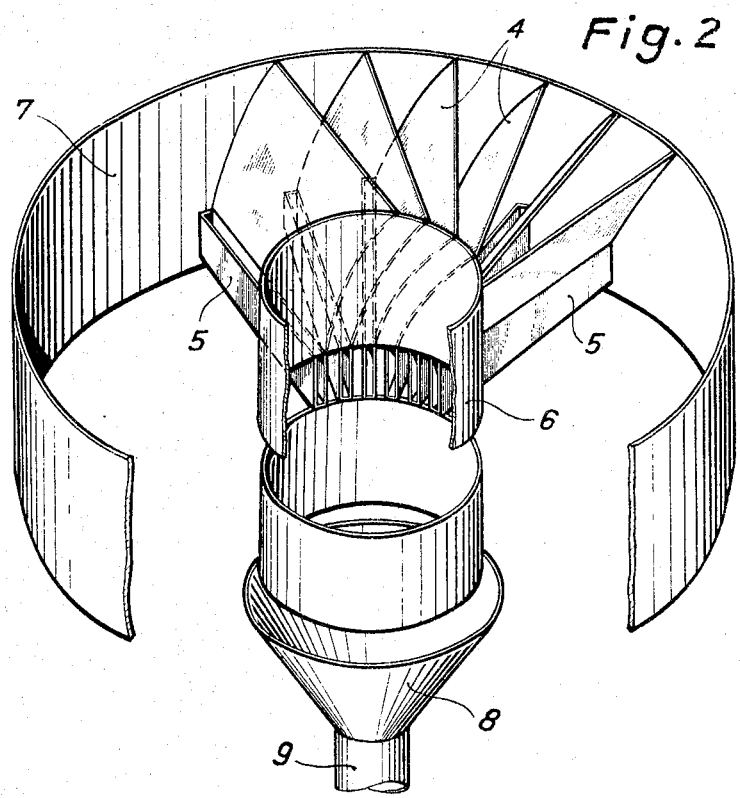
FIG. 2 is a perspective view of the collecting means shown in FIG. 1 with some of the guide elements and collecting troughs removed and the tubular casings partly broken away.

The upper section 2a has a bottom boundary, for instance, in the form of a perforated or grid-like lattice, that supports the statistical packing with which the section is filled and that permits descending liquid to flow therethrough. A plurality of radially extending, horizontally spaced, plate-like guide elements 4 are disposed below the bottom boundary of the section 2a, the guide elements being inclined with respect to vertical so that, in vertical projection, they are distributed over or cover the entire free column cross-section. The plate-like guide elements 4 preferably are arcuate as shown best in FIG. 2 and are identical to one another. Each guide element 4 is connected at its bottom end to a collecting trough 5, and the assembly of guide elements and collecting troughs are disposed in the form of a vane ring around a tubular member 6 disposed at the column center. The troughs 5 slope down towards the column center and their inner ends extend into the tubular member 6. As is shown more particularly by FIG. 2, the guide elements 4 and troughs 5 are connected, at their ends remote from the column center, to an outer tubular member 7 which is in liquid-tight engagement with the inside of the column casing 1 near the bottom boundary of the upper material exchange section 2a. The collecting means is advantageously secured to the column casing, for instance, by screws or bolts which extend through the column casing 1 and the tubular member 7.

The inner tubular member 6 extends below the inner ends of the collecting troughs 5 and terminates directly above a liquid collecting funnel 8 of a distributing device disposed immediately below. In the embodiment shown in the drawing the distributing device resembles a reaction water wheel. That is to say, a centrally positioned rotatable tube 9 is connected at its upper end to the funnel 8 and at its bottom end to two radial tubular members 10. The tubular members 10 are closed at their outer ends and are formed on opposite sides with discharge apertures 11 uniformly distributed over the column radius. The tube 9, which is closed at its bottom end, is rotatably mounted on a pin or the like 12 which bears, by means of support elements 13, against the inside of the column casing 1 and against the top surface of the lower material exchange section 2b.

In operation the liquid trickling down from the section 2a is caught by the guide elements 4, passes to the collecting troughs 5 and from thence flows through the inner tubular member 6 into the funnel 8. The liquid discharging from the apertures 11 rotates the system formed by the funnel 8, tube 9 and distributing tubes 10 so that the liquid collected from the upper material exchange section 2a is distributed uniformly over the top surface or cross-section of the lower material exchange section 2b where such liquid again undergoes a material exchange with the rising gas flow. Since the collecting means according to the invention occupies a very minor proportion of the column cross-section—for example, from about 10–20% (the guide elements 4 occupy only about 5%)—the gas flowing upwardly through the space 3 into the upper section 2a experiences only a relatively small pressure drop.

The reaction wheel type of distributing system shown in the drawing is a very advantageous form of distributing system, but other systems and devices, for instance, stationary systems, can of course be used in the practice of the invention to distribute the collected liquid.

Referring now to the embodiment of the invention, shown in FIGS. 3 and 4, again only a portion of a material exchange column is shown in diagrammatic form, like elements of the embodiments shown in FIGS. 1 and 3 having like reference numerals. The collecting system shown in FIGS. 3 and 4 comprises two groups (of which only one group is visible in the drawing) of parallel, horizontally spaced, inclined guide elements 15 disposed symmetrically with respect to a column diameter, sloping collecting troughs 16 connected to the bottom edges of each of the guide elements 15, and two header troughs 17 disposed beneath the inner ends of the troughs 16, the header troughs 17 sloping towards the column center so that the liquid collected by the collector means will flow into the distributor positioned immediately below. The outer ends of the guide elements 15, collecting troughs 16 and header troughs 17 are connected to the inner surface of tubular member 18 which is adapted to conform to the peripheral shape of the column, the top edge of the member 18 being in liquid-tight engagement with the column inner wall advantageously by way of an element 19 which engages like a collar around the bottom part of the upper material exchange section 2a. The particular embodiment of collecting means shown in FIGS. 3 and 4 is for a circular cross-section column, and in this case one extra inclined guide element 20 per group is provided on the inside of the tubular member 18 to deflect the liquid from the part of the edge zone of the exchange section 2a immediately over the guide element 20 into the trough 16 of the adjacent guide element 15. The same type of collecting system as shown in FIGS. 3 and 4 is particularly suitable for use in conjunction with rectangular cross-section columns, in which event all the guide elements 15 are of the same size as one another. This embodiment of the invention also covers the case in which only one group of guide elements and collecting troughs is provided which extend across the full width of the column. In this event the collecting troughs are, conveniently, V-shaped, with respect to their long axis, the troughs being formed at their lowest place with apertures through which the liquid descends into a header trough below; the header trough also being V-shaped and being formed at its lowest place with an aperture through which all the liquid descends into the distributor positioned therebelow.

The various elements of the collecting system, such as the guide elements, the collecting troughs and the inner and outer tubular members, can be made, for instance, of sheet-metal or of plastics. If sheet-metal is used, the guide elements, collecting troughs and tubular members can be connected to one another, for instance, by soldering or welding.

I claim:

1. In a material exchange column for effecting contact between a liquid and a gaseous medium flowing countercurrent therethrough, the column being subdivided into at least two material exchange sections which are separated vertically from one another by an intervening space, liquid collecting means being provided in said space for collecting liquid descending from the upper material exchange section and for conveying the liquid to distributor means for distributing the liquid onto the material exchange section disposed immediately below, the improvement which comprises providing liquid collecting means adapted to collect all of the liquid descending from the upper material exchange section, said collecting means comprising a plurality of downwardly extending plate-like guide elements disposed in horizontally spaced relationship with respect to each other over the cross-section of the material exchange section so that at any single horizontal plane extending through the horizontally spaced guide elements the guide elements physically block only a relatively small proportion of the total cross-section area of the column whereby an upwardly flowing gaseous medium can pass freely through the open passages between the guide elements, said horizontally spaced guide elements being inclined with respect to vertical so that the elements cover in vertical projection the entire free cross-section of the column, each guide element being provided with a liquid collecting trough adjacent the bottom edge thereof, said collecting troughs being adapted to collect the descending liquid flowing down the plate-like guide elements and to deliver said liquid to said distributor means which is adapted to distribute the liquid uniformly over the upper surface of the material exchange section located immediately below.

2. The material exchange column according to claim 1 in which the guide elements are arcuate.

3. The material exchange column according to claim 1 in which, at any single horizontal cross-section of the column, the horizontally spaced guide elements occupy less than about 20% of the total cross-section area of the column.

4. The material exchange column according to claim 1 in which the liquid distributor means comprises a rotatable tubular member freely rotatable about its vertically disposed longitudinal axis, said tubular member being provided with at least two radially extending distribution tubes communicating at their inner ends with the lower end of said tubular member, said distributor tubes being formed with a plurality of liquid discharge openings on opposite sides thereof.

5. The material exchange column according to claim 1 in which the horizontally spaced inclined guide elements are disposed radially about an inner stationary tubular member positioned at the column center, and in which the collecting troughs associated with said radial guide elements communicate with the interior of said stationary tubular member.

6. The material exchange column according to claim 5 in which the radially disposed guide elements and the collecting trough associated therewith are connected at their ends remote from the column center to an outer stationary tubular member which is connected in liquid-tight engagement to the inner surface of the column casing.

7. The material exchange column according to claim 1 in which the horizontally spaced inclined guide elements comprise at least one group of guide elements disposed substantially parallel to each other and symmetrically with respect to a column diameter, and in which the collecting troughs associated with said parallel guide elements of said group communicate with at least one header trough adapted to convey the collected liquid to the column center.

8. The material exchange column according to claim 7 in which the parallel guide elements and the collecting troughs associated therewith are connected at their outer ends to a stationary tubular member which conforms to the shape of the outer casing of the material exchange section and which is in liquid-tight engagement with the inner surface of said casing.

9. A material exchange column for effecting contact between a liquid and a gaseous medium flowing countercurrent therethrough, said column comprising at least two material exchange sections separated vertically from one another by an intervening space, collecting means disposed in said space for collecting liquid descending from the upper material exchange section and for conveying the liquid to a liquid distributor means, said liquid collecting means comprising a plurality of downwardly extending plate-like guide elements disposed in horizontally spaced relationship with respect to each other across the cross-section of the material exchange column so that at any single horizontal plane extending through the horizontally spaced guide elements the guide elements physically block only a relatively small proportion of the total cross-section area of the column whereby an upwardly flowing gaseous medium can pass freely through the open passages between the spaced guide elements, said horizontally spaced guide elements being inclined with respect to vertical so that they cover in vertical projection the entire free cross-section of the column, a collecting trough associated with the bottom edge of each guide element, said collecting troughs being adapted to collect the liquid flowing down the guide elements and to deliver said liquid to said liquid distributor means, and said liquid distributor means being adapted to distribute liquid delivered thereto uniformly over the upper surface of the material exchange section positioned therebelow.

References Cited by the Examiner
UNITED STATES PATENTS

| | | | |
|---|---|---|---|
| 2,080,713 | 5/1937 | Hayes | 261—110 |
| 2,560,635 | 7/1951 | Conyers | 261—98 |
| 2,915,302 | 12/1959 | Jacir | 261—11 |
| 2,974,936 | 3/1961 | Van Ackeren et al. | 261—111 XR |
| 3,136,828 | 6/1964 | Rideout | 261—98 |

HARRY B. THORNTON, *Primary Examiner.*

T. R. MILES, *Assistant Examiner.*